US011156324B2

(12) United States Patent
Shan et al.

(10) Patent No.: US 11,156,324 B2
(45) Date of Patent: Oct. 26, 2021

(54) CLAMPING MECHANISM AND HANDHELD GIMBAL

(71) Applicants: Jinghua Shan, Shenzhen (CN); Yi Bing Peng, Shenzhen (CN)

(72) Inventors: Jinghua Shan, Shenzhen (CN); Yi Bing Peng, Shenzhen (CN)

( * ) Notice: Subject to any disclaimer, the term of this patent is extended or adjusted under 35 U.S.C. 154(b) by 0 days.

(21) Appl. No.: 16/512,407

(22) Filed: Jul. 16, 2019

(65) Prior Publication Data
US 2020/0309311 A1   Oct. 1, 2020

(30) Foreign Application Priority Data

Mar. 27, 2019 (CN) .......................... 201920400204.2

(51) Int. Cl.
*F16M 11/08* (2006.01)
(52) U.S. Cl.
CPC ....... *F16M 11/08* (2013.01); *F16M 2200/041* (2013.01)
(58) Field of Classification Search
CPC .................. F16M 11/08; F16M 2200/041
See application file for complete search history.

(56) References Cited

U.S. PATENT DOCUMENTS

| 8,727,192 | B2 * | 5/2014 | Lai ....................... F16M 13/022 224/420 |
| 9,448,588 | B2 * | 9/2016 | Barnard ................. F16M 11/40 |
| 9,476,439 | B1 * | 10/2016 | Liao ..................... F16M 11/041 |
| 10,718,466 | B2 * | 7/2020 | Chen ..................... F16M 11/38 |
| 2004/0206870 | A1 * | 10/2004 | Worrall .............. F16M 11/2078 248/278.1 |
| 2005/0116684 | A1 * | 6/2005 | Kim ..................... H04B 1/3883 320/114 |
| 2018/0066792 | A1 * | 3/2018 | Chen ..................... F16M 13/00 |
| 2019/0072233 | A1 * | 3/2019 | Wang .................... F16M 11/04 |
| 2019/0263326 | A1 * | 8/2019 | Yu ......................... F16M 13/00 |

* cited by examiner

*Primary Examiner* — Anita M King

(57) ABSTRACT

The present disclosure relates to a field of shooting support device, and to a clamping mechanism and a handheld gimbal. The clamping mechanism includes an upper clamping portion, a lower clamping portion opposite to the upper clamping portion, a clamping arm connected to the upper clamping portion and the lower clamping portion, a connecting aim rotably connected with the clamping arm, and a locking component. The locking component limits relative rotation of the clamping arm and the connecting arm. The locking component is disposed on a rotational connection position of the clamping armor and the connecting arm.

12 Claims, 5 Drawing Sheets

CLAMPING MECHANISM AND HANDHELD GIMBAL

TECHNICAL FIELD

The present disclosure relates to a field of shooting support devices, and specifically to a clamping mechanism and a handheld gimbal.

BACKGROUND

A handheld gimbal is also known as a mobile phone stabilizer or an anti-shake gimbal. The handheld gimbal not only has the function of a traditional selfie stick, but also balance and accuracy of the handheld gimbal are higher than the selfie stick. The handheld gimbal has a built-in mechanical balance adjustment system. Users do not need to use other tools, the balance of the smartphone can automatically adjust, which effectively reduces picture blur, picture shaking, and other problem due to shake.

However, when the handheld gimbal powers off or runs out of power, the mobile phone shakes or even rotates after clamping of the mobile phone, which causes the mobile phone to switch between vertical and horizontal screens. Therefore, the current handheld gimbal still needs to improve.

SUMMARY

The present disclosure to solve the technical problems thereof is against the above defects in the prior art, provides a clamping mechanism to avoid the rotation of a mobile phone.

The technical schema of the present disclosure to solve the technical problems thereof is: provides the clamping mechanism, comprises an upper clamping portion, a lower clamping portion opposite to the upper clamping portion, a clamping arm connected to the upper clamping portion and the lower clamping portion, a connecting arm rotably connected with the clamping arm, and a locking component. The locking component limits relative rotation of the clamping arm and the connecting arm. The locking component is disposed on a rotational connection position of the clamping arm and die connecting arm.

Furthermore, the locking component comprises a locking ring and a ring seat. The ring seat is disposed on the clamping arm. The ring seat protrudes toward the connecting aim. An external thread is disposed on the ring seat. An internal thread is disposed on the locking ring and matches with the external thread. The locking ring is moved toward the clamping arm by matching the internal thread with the external thread when the locking ring rotates. And the locking ring is pressed against the clamping aim to lock the clamping arm and the connecting arm.

Furthermore, a knurl is disposed on a periphery surface of the locking ring to increase friction.

Furthermore, the clamping mechanism further comprises a permanent magnet pole, a winding coil and a rotating shaft. A first end of the rotating shaft is fixedly connected with the connecting arm. The permanent magnet pole is fixedly disposed on the connecting arm and is coaxial with the rotating shaft. A sleeve is disposed on the clamping arm. The clamping arm protrudes toward the connecting arm. And a second end of the rotating shaft is inserted into the sleeve and the second end of the rotating shaft is rotably connected to the sleeve. The winding coil is disposed on the sleeve and is located inside the permanent magnet pole.

Furthermore, reinforcing ribs are disposed on the clamping arm. A first end of the reinforcing rib is connected to the ring seat. A second end of the reinforcing rib is connected to the sleeve.

Furthermore, the clamping mechanism further comprises a charging interface, a battery, and a printed circuit board (PCB). The PCB is disposed on an interior of the clamping arm. A first end of the charging interface is electrically connected to the PCB. A second end of the charging interface is exposed on the clamping arm. The battery is electrically connected to the PCB and disposed on the interior of the clamping arm. And the winding coil is electrically connected to the PCB.

Furthermore, the locking component comprises the locking ring and the ring seat. The ring seat is disposed on the connecting arm and protrudes toward the clamping arm. An external thread is disposed on the ring seat. An internal thread is disposed on the locking ring and matches with the external thread. The locking ring is moved toward the clamping arm by matching of the internal thread and the external thread when the locking ring rotating. And the locking ring is pressed against the clamping arm to lock the clamping arm and the connecting arm.

Furthermore, provides a handheld gimbal, comprises a handle, further comprises the clamping mechanism. One end of the handle is rotably connected to the connecting arm.

Furthermore, the handheld gimbal further comprises a wireless remote. The wireless remote is detachably disposed on the handle.

Furthermore, the handheld gimbal further comprising a telescopic rod, the telescopic rod stores in the handle. A first end of the telescopic rod is connected to the handle. And a second end of the telescopic rod is rotably connected to the connecting arm.

The beneficial effect of the present disclosure is: an angle between, the clamping arm and the connecting arm is locked through the locking component is disposed between the clamping aria and the connecting arm, and the locking component limits relative rotation of the clamping arm and the connecting am. Thereby, avoiding the mobile phone still rotates after adjusting the shooting angle, which greatly improves the use experience of the handheld gimbal.

BRIEF DESCRIPTION OF DRAWINGS

An embodiment of the present disclosure will be further described in the following with the drawings and embodiments, in the figures.

DETAILED DESCRIPTION

A preferred embodiment of the present disclosure is detailed description in the following with reference to the drawings.

Figure 1:
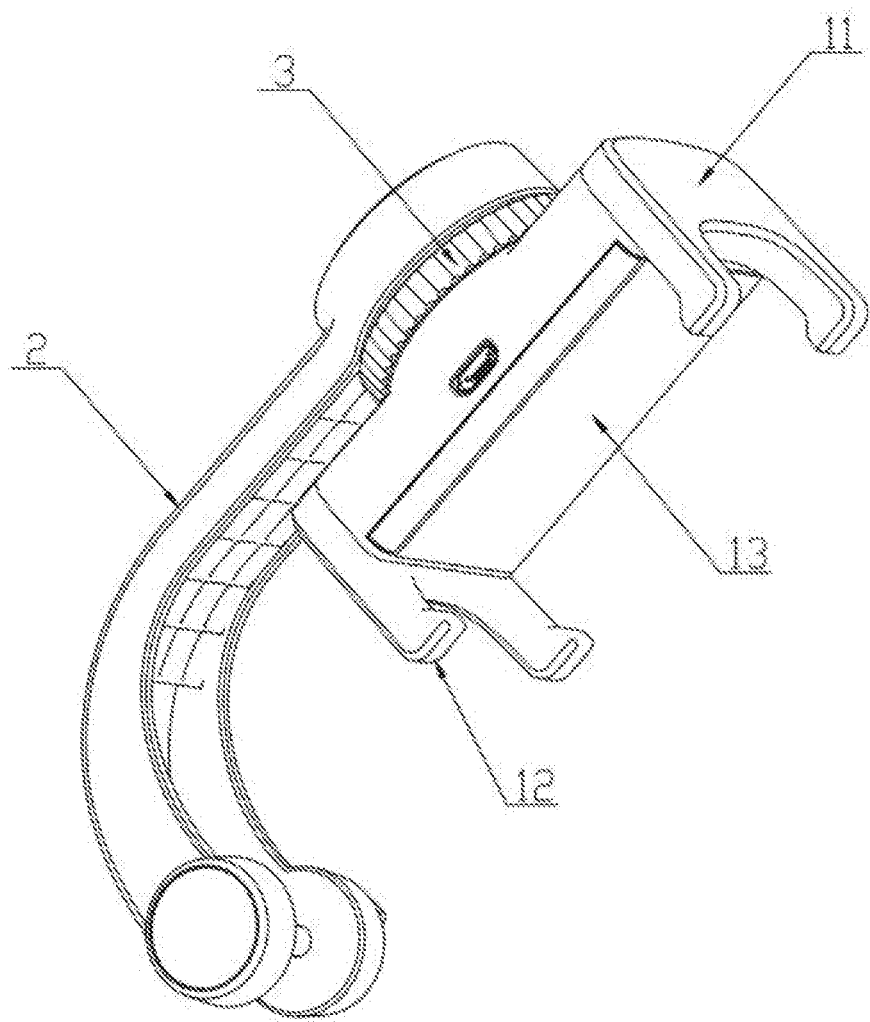
FIG. 1 is a schematic perspective view of a clamping mechanism of the embodiment of the present disclosure.
Figure 2:
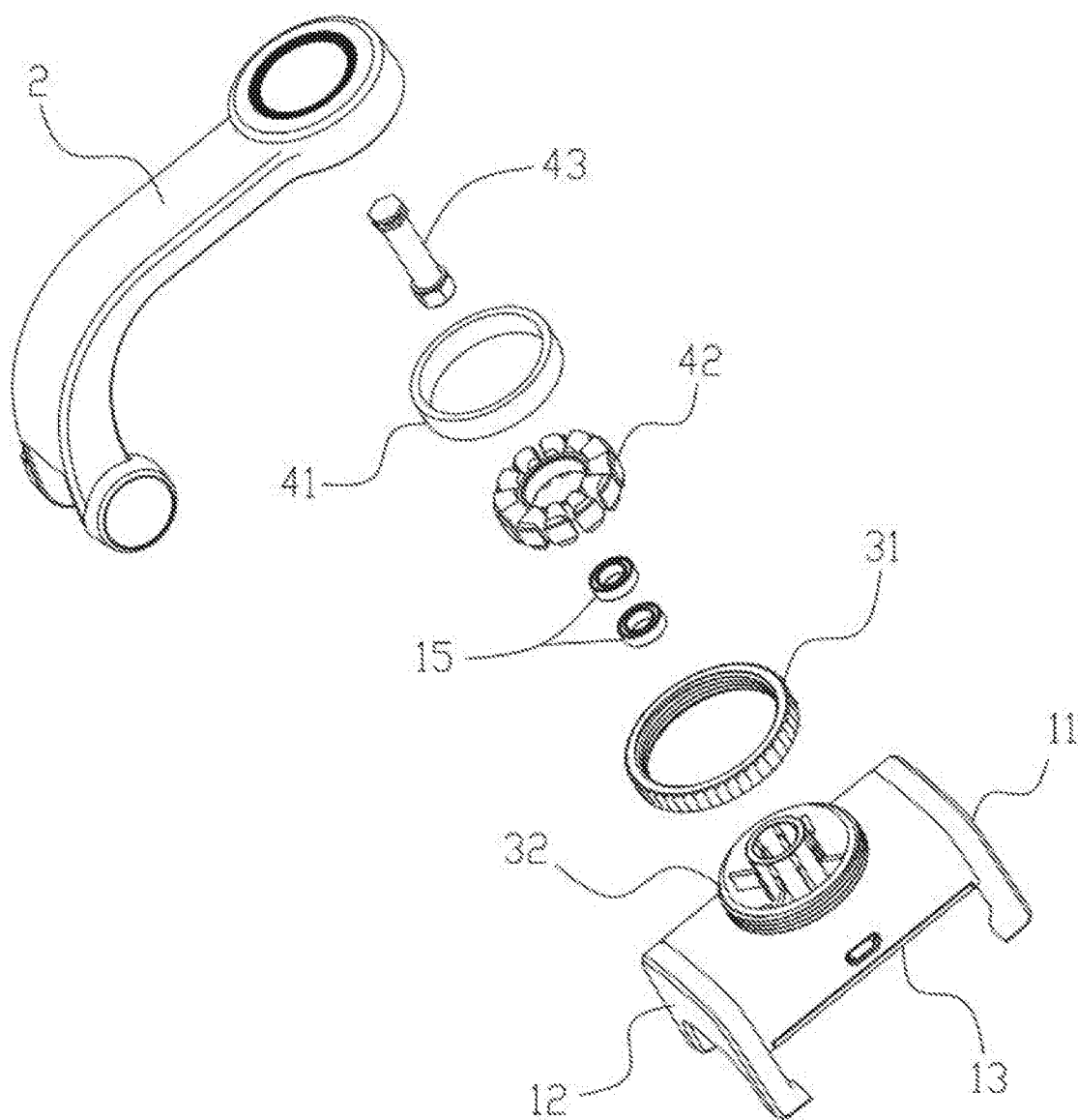
FIG. 2 is a schematic exploded view of the clamping mechanism of the embodiment of the present disclosure.

As shown in FIGS. 1 and 2, the embodiment of the present disclosure provides a clamping mechanism including an upper clamping portion 11, a lower clamping portion 12 opposite to the upper clamping portion 11, a clamping arm 13 connected to the upper clamping portion 11 and the lower clamping portion 12, a connecting arm 2 rotably connected with the clamping arm 13. The clamping mechanism further includes a locking component 3, the locking component limits relative rotation of the clamping arm 13 and the connecting arm 2. The locking component is disposed on a rotational connection position of the clamping arm 13 and the connecting arm 2. Locking an angle between the clamping arm 13 and the connecting arm 2 is achieved through the locking component 3 disposed between the clamping arm 13 and the connecting arm 2. The locking component 3 limits relative rotation of the clamping arm 13 and the connecting aim 2, thereby avoiding the mobile phone from still rotating after adjusted the shooting angle, which greatly improves user experience of the handheld gimbal.

Figure 3:
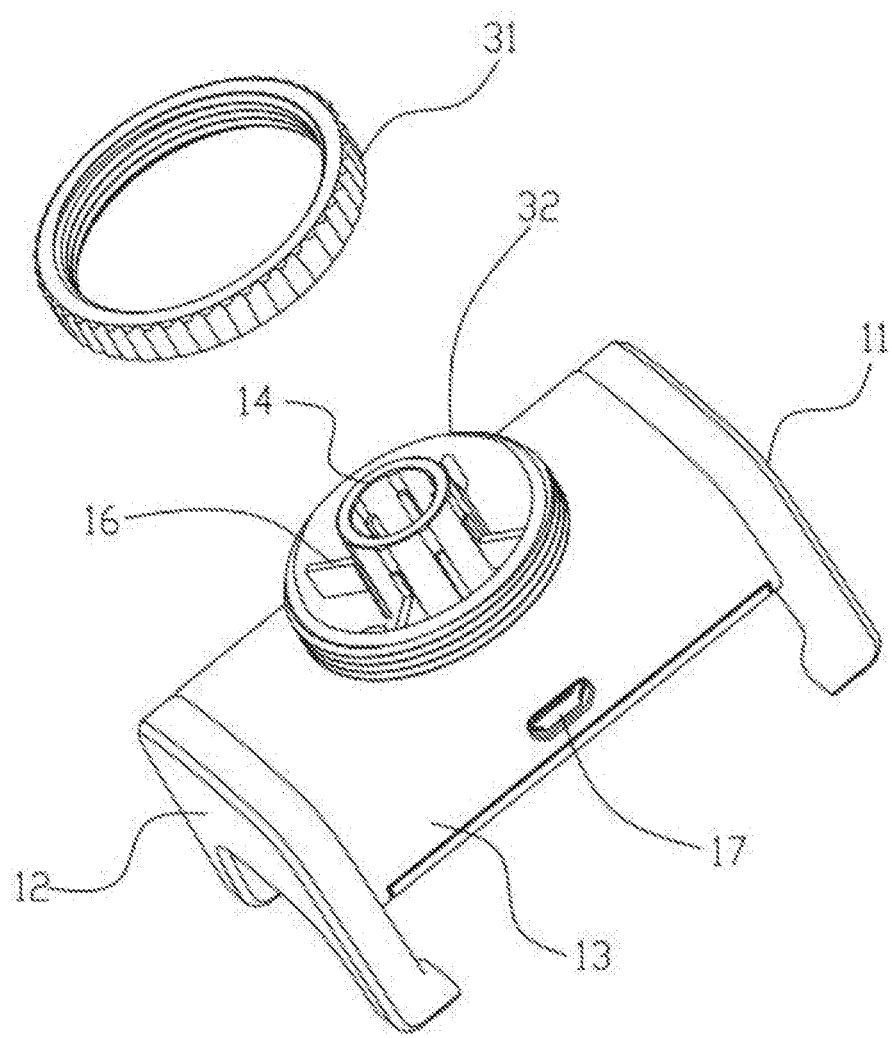
FIG. 3 is a schematic exploded view of a locking component of the embodiment of the present disclosure.

As shown in FIG. 3, to be specific, the locking component includes a locking ring 31 and a ring seat 32. The ring seat 32 is disposed on the clamping arm 13. And the ring seat protrudes toward the connecting arm 2. An external thread is disposed on the ring seat 32. An internal thread is disposed on a locking ring 31. And the internal thread matches with the external thread. The locking component is movably disposed on the ring seat 32 through matching of the internal thread and the external thread. To facilitate the rotation of the locking ring 31, a knurl is disposed on a periphery surface of the locking ring 31 to increase friction. When the clamping arm 13 is required to rotate, the locking ring 31 is moved away from the connecting arm 2 by loosening the locking ring 31. When the clamping arm 13 is required to fix, the locking ring 31 is pressed against the connecting arm 2 to prevent the rotation of the clamping arm 13 by tightening the locking ring 31. Similarly, the ring seat 32 is disposed on the connecting arm 2 and the seat ring 32 protrudes toward the clamping arm 13. The locking ring 31 is moved toward the clamping arm 13 by matching of the internal thread and the external thread when the locking ring rotating. And the locking ring is pressed against the clamping arm 13 to lock the clamping arm 13 and the connecting arm 2.

Figure 4:
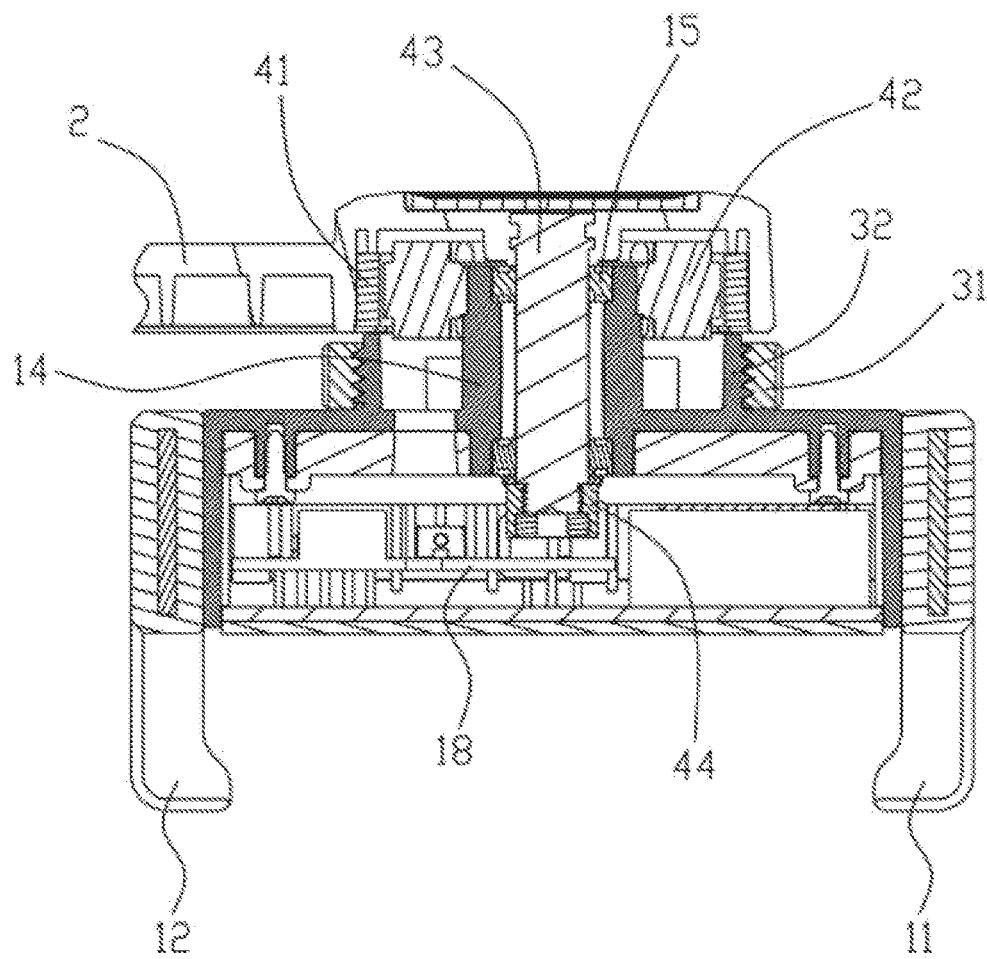
FIG. 4 is a cross-sectional view of the clamping mechanism of the embodiment of the present disclosure.

As shown in FIGS. 2 and 4, in order to improve the user experience of the clamping mechanism, the clamping arm 13 can rotate manually or electrically. The clamping mechanism further includes a gimbal motor. The gimbal motor includes a ring magnet 41, a winding coil 42, and a rotating shaft 43. A first end of the rotating shaft 43 is fixedly connected with the connecting arm 2. The ring magnet 41 is fixedly disposed on the connecting arm 2 and is coaxial with the rotating shaft 43. A sleeve 14 is disposed on the clamping arm 13. And the sleeve protrudes toward the connecting arm 2. A second end of the rotating shaft 43 is inserted into the sleeve 14 and the rotating shaft is connected to rotate sleeve 14. The winding coil 42 is disposed on the sleeve 14 and inside the ring magnet 41. When the clawing device is electrically rotated, the clamping device has an adaptive balancing function. More preferably, in order to increase the strength of the sleeve 14 and the ring seat 32, a plurality of reinforcing ribs 16 are disposed on the clamping aim 13. A first end of the reinforcing rib 16 is connected to the ring seat 32. A second end of the reinforcing rib 16 is connected to the sleeve 14.

Figure 5:
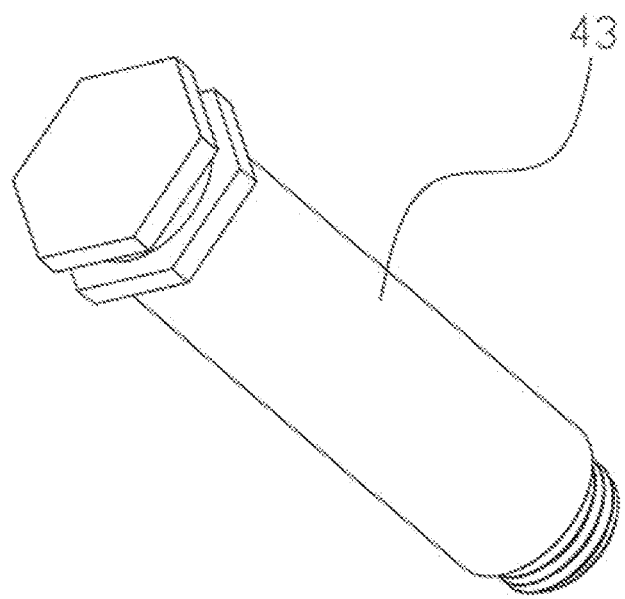
FIG. 5 is a perspective view of a rotating shaft of the embodiment of the present disclosure.
Figure 6:
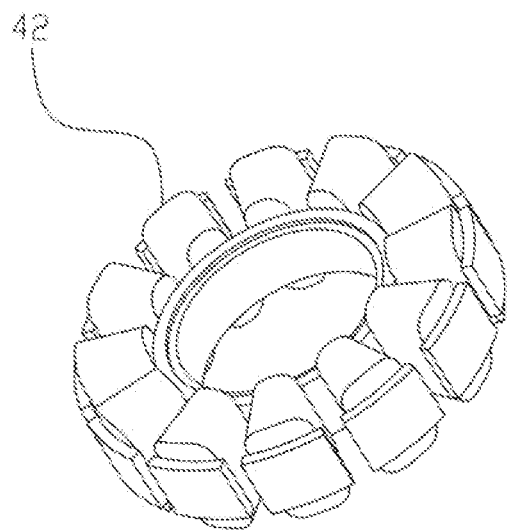
FIG. 6 is a schematic perspective view of a winding coil of the embodiment of the present disclosure.

Referring to FIGS. 5 and 6, the first end of the rotating shaft 43 is a hexagonal structure. The rotating shaft is non-rotated and fixed on the connecting arm 2 by the hexagonal structure. An annular ring-shaped magnet 41 is disposed on the connecting arm 2 and is coaxial with the rotating shaft 43. The clamping arm 13 provides a sleeve 14, which protrudes toward the connecting arm 2. The sleeve 14 has two bearings 15. The second end of the rotating shaft 43 is coaxially connected to the sleeve 14 through the above-described two bearings 15. The end of the rotating shaft 43 rotably disposed the clamping arm 13 on the rotating shaft 43 by a gasket and a locknut 44. The winding coil 42 is disposed on the sleeve 14 and inside of the ring magnet 41. Preferably, in the present embodiment, the winding coil 42 includes 11 sets of sub-coils disposed at angular distribution.

With continued reference to FIGS. 3 and 4, the clamping mechanism further includes a charging interface 17, a battery, and a printed circuit board (PCB) 18. The PCB 18 is disposed on an interior of the clamping arm 13. A first end of the charging interface 17 is electrically connected to the PCB 18. A second end of the charging interface 17 is exposed on the clamping arm 13. The battery is electrically connected to the PCB 18 and disposed on the interior of the clamping arm 13. The winding coil 42 is electrically connected to the PCB 18 and the battery is powered by a battery.

The manner of working of the clamping mechanism of the embodiment is: before the clamping mechanism works, the locking ring 31 is released. The locking ring 31 moved downward (the direction shown in the figure). Thereby, a gap is reserved between the locking ring 31 and the connecting arm 2. After that, opening the power of the clamping mechanism, the gimbal motor drives the clamping arm 13 to rotate in a certain angle, and ensures the balance of the clamping arm 13 and the mobile phone is disposed on the clamping arm 13. When the gimbal motor is powered off, after manually rotates the clamping arm 13 to the desired shooting angle, the locking ring 31 is moved upwardly and reached the connecting arm 2 by tightening the locking ring 31. Thereby, locking the angle between the clamping arm 13 and the connecting arms 2 is realized.

Figure 7:
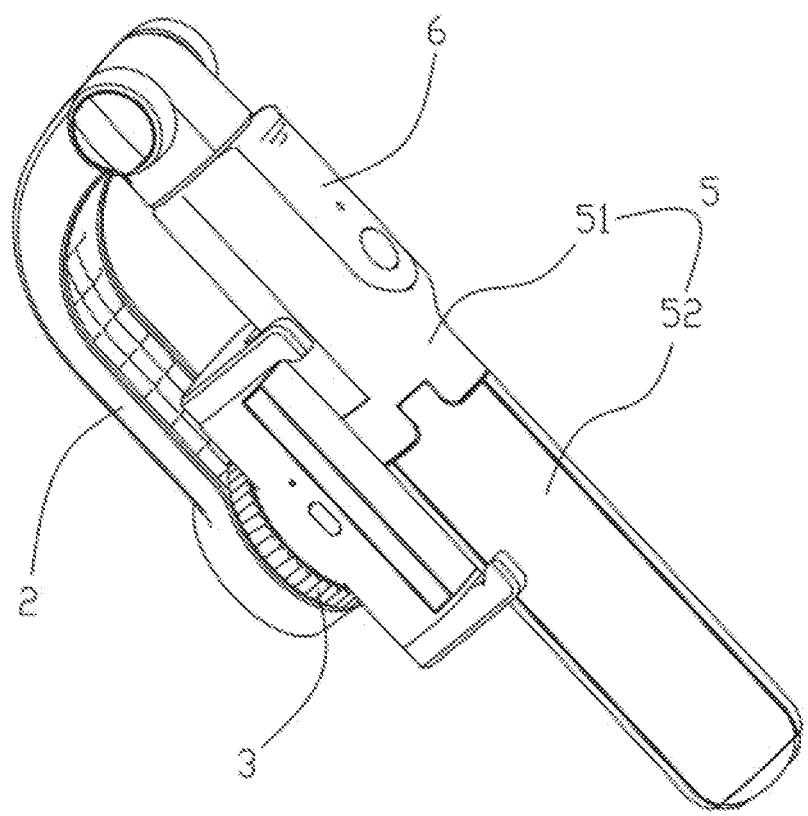
FIG. 7 is a schematic perspective view of a handheld gimbal of the embodiment of the present disclosure.

Further, as shown in FIG. 7, the present disclosure provides a handheld gimbal, which includes a handle 5, a telescopic rod (not shown in figure) and the above clamping mechanism. To be specific, a first end of the telescopic rods connected to the handle 5. A second end of the telescopic rod is rotably connected the connecting arm. The handle includes a sleeve portion 51 and at least three support legs 52 rotably connected a lower end of the sleeve portion 51. Preferably, the handle 5 of the present embodiment includes three support legs. The three supporting legs 52 can handheld use after being folded. The sleeve portion 51 with inside of the folded supporting leg 52 form a hollow cavity. The telescopic rod is configured to store inside an interior of the hollow cavity. When selfie of the tripod mode is needed, the three supporting legs 52 is unfolded to use. When the handheld selfie or storage is performed, the three supporting legs 52 is rotated to close the telescopic rod, which is very convenient and quick for holding or storage of the three supporting legs.

In order to enhance the user experience of the handheld gimbal, the handheld gimbal further includes a wireless remote 6. The wireless remote 6 detachably disposed on the sleeve portion 51. When tripod mode selfie is used, since the distance between the user and the handheld gimbal is far, a remote control of a remote shooting by a handheld wireless remote 6 is achieved. When the handheld shooting mode is used, the short-distance shooting through the wireless remote 6, which is assembled on the handle 5.

The above embodiments are only used to illustrate the technical proposal of the present disclosure and are not limited for it. For those skilled in the art, the technical proposal described in the above embodiments can be modified, or some feature of the technical can be equivalently substituted; All such modifications and substitutions are intended to be included within the scope of the appended claims.

What is claimed is:

1. A clamping mechanism, comprising:
an upper clamping portion, a lower clamping portion opposite to the upper clamping portion, a clamping arm connected to the upper clamping portion and the lower clamping portion, a connecting arm rotatably connected with the clamping arm, and a locking component; the locking component limits relative rotation of the clamping arm and the connecting arm; the locking component is disposed on a rotational connection position of the clamping arm and the connecting arm;
wherein the clamping mechanism further comprises a permanent magnet pole, a winding coil and a rotating shaft; a first end of the rotating shaft is fixedly connected with the connecting arm; the permanent magnet pole is fixedly disposed on the connecting arm and is coaxial with the rotating shaft a sleeve is disposed on the clamping arm; the clamping arm protrudes toward the connecting arm; and a second end of the rotating shaft is inserted into the sleeve and the second end of the rotating shaft is rotatably connected to the sleeve; the winding coil is disposed on the sleeve and is located inside the permanent magnet pole.

2. The clamping mechanism according to claim 1, wherein a knurl is disposed on a periphery surface of the locking ring to increase friction.

3. The clamping mechanism according to claim 1, wherein reinforcing ribs are disposed on the clamping arm; a first end of the reinforcing rib is connected to the ring seat; and a second end of the reinforcing rib is connected to the sleeve.

4. The clamping mechanism according to claim 1, further comprising a charging interface, a battery, and a printed circuit board (PCB); the PCB is disposed on an interior of the clamping arm; a first end of the charging interface is electrically connected to the PCB; a second end of the charging interface is exposed on the clamping arm; the battery is electrically connected to the PCB and disposed on the interior of the clamping arm; and the winding coil is electrically connected to the PCB.

5. The clamping mechanism according to claim 1, wherein the locking component comprises a locking ring and a ring seat; the ring seat is disposed on the connecting arm and protrudes toward the clamping arm; an external thread is disposed on the ring seat; an internal thread is disposed on the locking ring and matches with the external thread; the locking ring is moved toward the clamping arm by matching of the internal thread and the external thread when the locking ring rotating; and the locking ring is pressed against the clamping arm to lock the clamping arm and the connecting arm.

6. A handheld gimbal, comprising:
a handle,
the clamping mechanism according to claim 1, wherein one end of the handle is rotatably connected to the connecting arm.

7. The handheld gimbal according to claim 6, wherein a knurl is disposed on a periphery surface of the locking ring to increase friction.

8. The handheld gimbal according to claim 6, wherein reinforcing ribs are disposed on the clamping arm; a first end of the reinforcing rib is connected to the ring seat; and a second end of the reinforcing rib is connected to the sleeve.

9. The handheld gimbal according to claim 6, further comprising a charging interface, a battery, and a printed circuit board (PCB); the PCB is disposed on an interior of the clamping arm; a first end of the charging interface is electrically connected to the PCB; a second end of the charging interface is exposed on the clamping arm; the battery is electrically connected to the PCB and disposed on the interior of the clamping arm; and the winding coil is electrically connected to the PCB.

10. The handheld gimbal according to claim 6, wherein the locking component comprises a locking ring and a ring seat; the ring seat is disposed on the connecting arm and protrudes toward the clamping arm; an external thread is disposed on the ring seat; an internal thread is disposed on the locking ring and matches with the external thread; the locking ring is moved toward the clamping arm by matching of the internal thread and the external thread when the locking ring rotating; and the locking ring is pressed against the clamping arm to lock the clamping arm and the connecting arm.

11. The handheld gimbal according to claim 6, further comprising a wireless remote, the wireless remote is detachably disposed on the handle.

12. The handheld gimbal according to claim 6, further comprising a telescopic rod, the telescopic rod stores in the handle; a first end of the telescopic rod is connected to the handle; and a second end of the telescopic rod is rotatably connected to the connecting arm.

* * * * *